United States Patent
McLennan et al.

(10) Patent No.: US 6,170,884 B1
(45) Date of Patent: Jan. 9, 2001

(54) PIPE COUPLING FOR PLAIN ENDED PIPE AND FOR PLAIN ENDED PIPE ATTACHED TO GROOVED PIPE

(75) Inventors: William Ross McLennan; Dennis R. Brown, both of Easton, PA (US); Douglas R. Dole, Whitehouse Station, NJ (US)

(73) Assignee: Victaulic Company of America, Easton, PA (US)

( * ) Notice: Under 35 U.S.C. 154(b), the term of this patent shall be extended for 0 days.

(21) Appl. No.: 09/100,787

(22) Filed: Jun. 18, 1998

Related U.S. Application Data

(63) Continuation-in-part of application No. 08/690,481, filed on Jul. 31, 1996, now Pat. No. 5,911,446, which is a continuation of application No. 08/665,478, filed on Jun. 18, 1996, now abandoned.

(51) Int. Cl.[7] ........................................... F16L 17/00
(52) U.S. Cl. .............................. 285/112; 285/915
(58) Field of Search ..................... 285/112, 340, 285/367, 373, 915; 411/5, 10

(56) References Cited

U.S. PATENT DOCUMENTS

| | | | |
|---|---|---|---|
| 2,225,208 | * 12/1940 | Crickmer | 285/340 X |
| 3,116,078 | * 12/1963 | Scherer | 285/112 X |
| 3,174,386 | * 3/1965 | Lewis | 411/10 |
| 3,423,111 | * 1/1969 | Elsner | 285/340 |
| 3,444,775 | * 5/1969 | Hills | 411/5 |
| 4,146,254 | * 3/1979 | Turner et al. | 285/340 X |
| 4,842,306 | * 6/1989 | Zeidler et al. | 285/340 X |
| 5,058,931 | * 10/1991 | Bowsher | 285/112 |
| 5,911,446 | * 6/1999 | McLennan et al. | 285/104 |

OTHER PUBLICATIONS

Victaulic Mechanical Piping Systems General Catalog, Vitaulic Company of America, p. 73, 1988.*

* cited by examiner

Primary Examiner—Lynne H. Browne
Assistant Examiner—Greg Binda
(74) Attorney, Agent, or Firm—Abelman, Frayne & Schwab

(57) ABSTRACT

A segmented coupling for use in coupling lengths of plain ended pipe employs cutter members of high strength steel to perform the required interconnection of the pipes, the cutter members being immovably held in the respective coupling segments and, upon tightening down of the coupling being operative to bite into the exterior surface of the associated pipes.

45 Claims, 9 Drawing Sheets

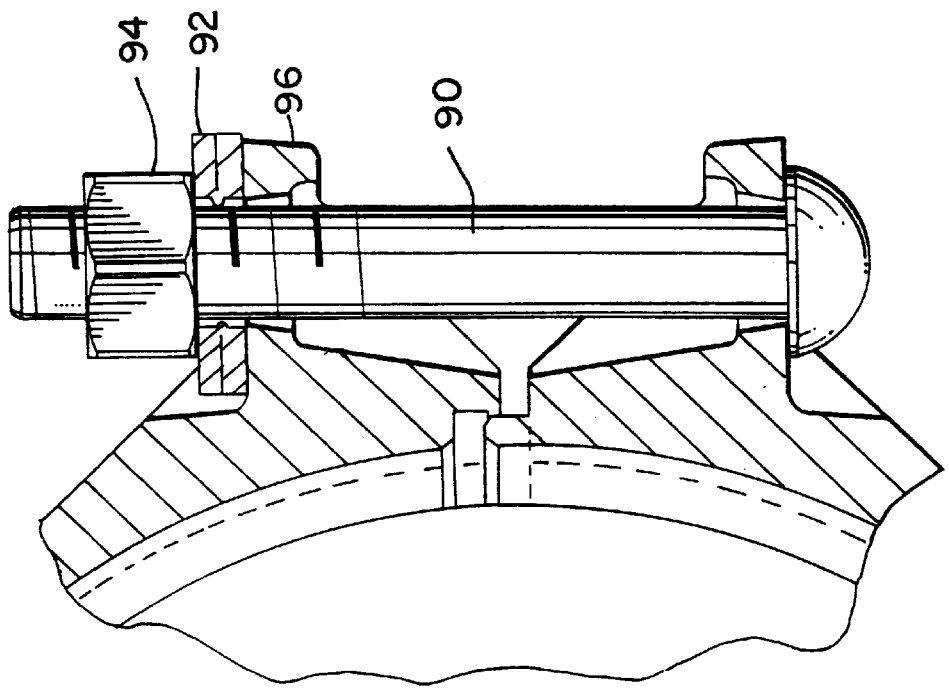
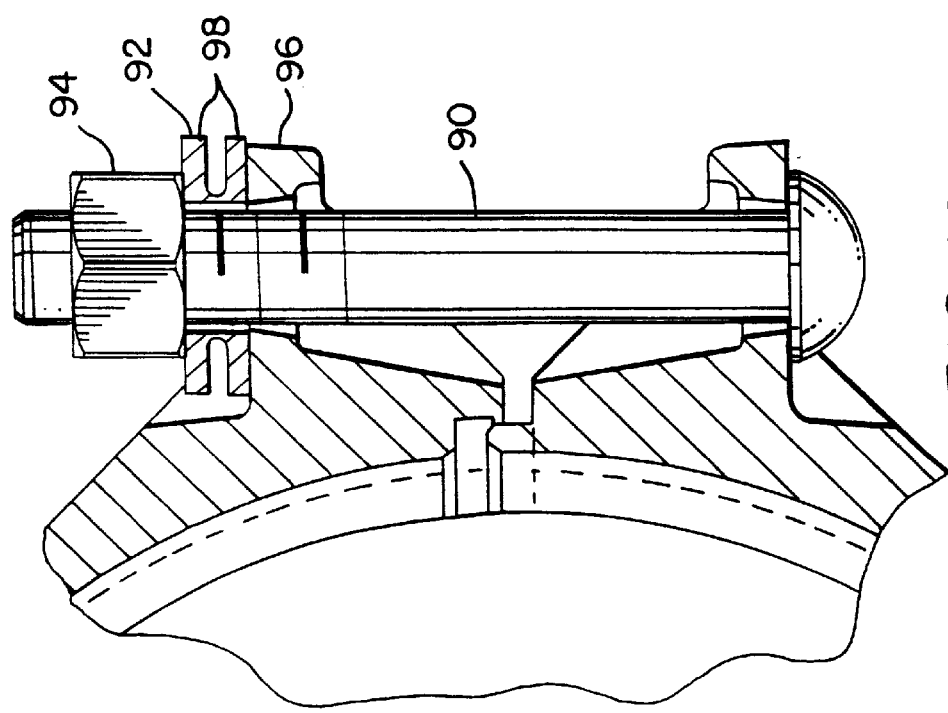

PIPE COUPLING FOR PLAIN ENDED PIPE AND FOR PLAIN ENDED PIPE ATTACHED TO GROOVED PIPE

CROSS REFERENCE TO RELATED APPLICATIONS

This is a continuation-in-part of application Ser No. 08/690,481, filed on Jul. 31, 1996, U.S. Pat. No. 5,911,446, which is a continuation of application Ser. No. 08/665,478, filed on Jun. 18, 1996, now abandoned.

FIELD OF THE INVENTION

This invention relates to a segmented pipe coupling comprised of two or more coupling segments that are secured to each other in end-to-end relationship by traction bolts that extend through bolting pads of the coupling segments.

Segmented pipe couplings are employed for interconnecting lengths of pipe with each other or for connecting a fitting to a length of pipe, the segmented pipe coupling encompassing a sealing gasket that is held in compressed relationship within the segmented pipe coupling upon tightening of the coupling down onto the pipes or fittings.

BACKGROUND OF THE INVENTION

Segmented pipe couplings are well-known in the art, the respective coupling segments of such couplings being comprised of castings of a ductile iron.

The sealing gaskets that are to be positioned within the segmented pipe coupling commonly are formed from an elastomeric material, and include sealing lips, and if desired, a centrally located radially extending stem to be trapped between the adjacent ends of the pipes to be coupled by the coupling.

More commonly, the coupling segments include circumferentially extending keys at their respective opposite sides, the keys being for reception within grooves cut or otherwise formed in the exterior circumference of the pipes, the keys acting to resist axial stresses that are generated in the pipes, those axial stresses being absorbed by the coupling as a tensile or a compressive stress.

Other forms of such couplings have been proposed, in which the keys are separate from the coupling and are mechanically affixed to the external surface of the pipes, the keys then being received within grooves provided in the respective coupling segments.

Each of those constructions is encumbered with the disadvantage that either the pipes must be provided with cut or rolled grooves in their outer periphery, with the expense attendant thereon, or, the keys must be affixed mechanically to the pipe periphery, again with the expenses attendant thereon.

Such coupling segments are considered to be of minimal utility in the interconnection of pipes that have not been provided with grooves, or which have not been provided with mechanically attached keys, the reason being that the casting operation employed in the manufacture of the coupling segments, and, the material from which the coupling segments are cast are not conducive to the provision of sharp edges of a sufficient hardness for them to bite into the pipe exterior, in order to provide the required positive, as opposed to frictional, interconnection between the coupling and the respective pipes or fittings.

SUMMARY OF THE INVENTION

The present invention has for its object to provide a segmented pipe coupling formed from coupling segments that can be castings of ductile iron, and which can be employed in the assembly of a segmented pipe coupling specifically intended for use in coupling plain ended pipes or fittings, i.e., pipes or fittings that are devoid of grooves for the reception of keys, or which are devoid of keys mechanically affixed to the pipes or fittings. In an alternative form, the present invention can also provide a segmented pipe coupling formed from coupling segments that can be castings of ductile iron, and which can be employed in the assembly of a segmented pipe coupling specifically intended for use in coupling plain ended pipes or fittings to grooved pipes or fittings.

According to the present invention, coupling segments for assembly into a segmented pipe coupling to be employed with plain ended pipe, are formed for castings of a ductile iron, and, include circumferentially extending recesses in their inner periphery for the reception of hardened steel cutter members having cutting edges that extend radially inwardly of the inner periphery of the coupling segments.

The cutter members are secured within the coupling segments by crimping the adjacent walls of the coupling segment in order to securely trap the cutter members within their associated recesses or by the use of acrylic adhesive or other affixation means adhering adjacent cutter members to each other and to the walls of the recesses.

The cutter members, at their radially innermost edges are provided with a sharp cutting edge that has been formed on the cutter members by a grinding operation, the cutter members at the respective opposite sides of the coupling segment being inclined towards each other to produce a biting action on the periphery of plain ended pipe that is resistive to axial forces applied to the pipe, and which additionally is resistive to angling or bending forces that may be exerted on the pipes or fittings.

The alternative form of the invention employs a coupling with cutter members as previously described to secure a plain ended pipe or fitting and a projection or key fitting within the groove of a grooved pipe or fitting to secure it.

DESCRIPTION OF THE DRAWINGS

The invention will be more readily understood from a reading of the following specification and by reference to the following drawings forming a part thereof and wherein.

Figure 7:
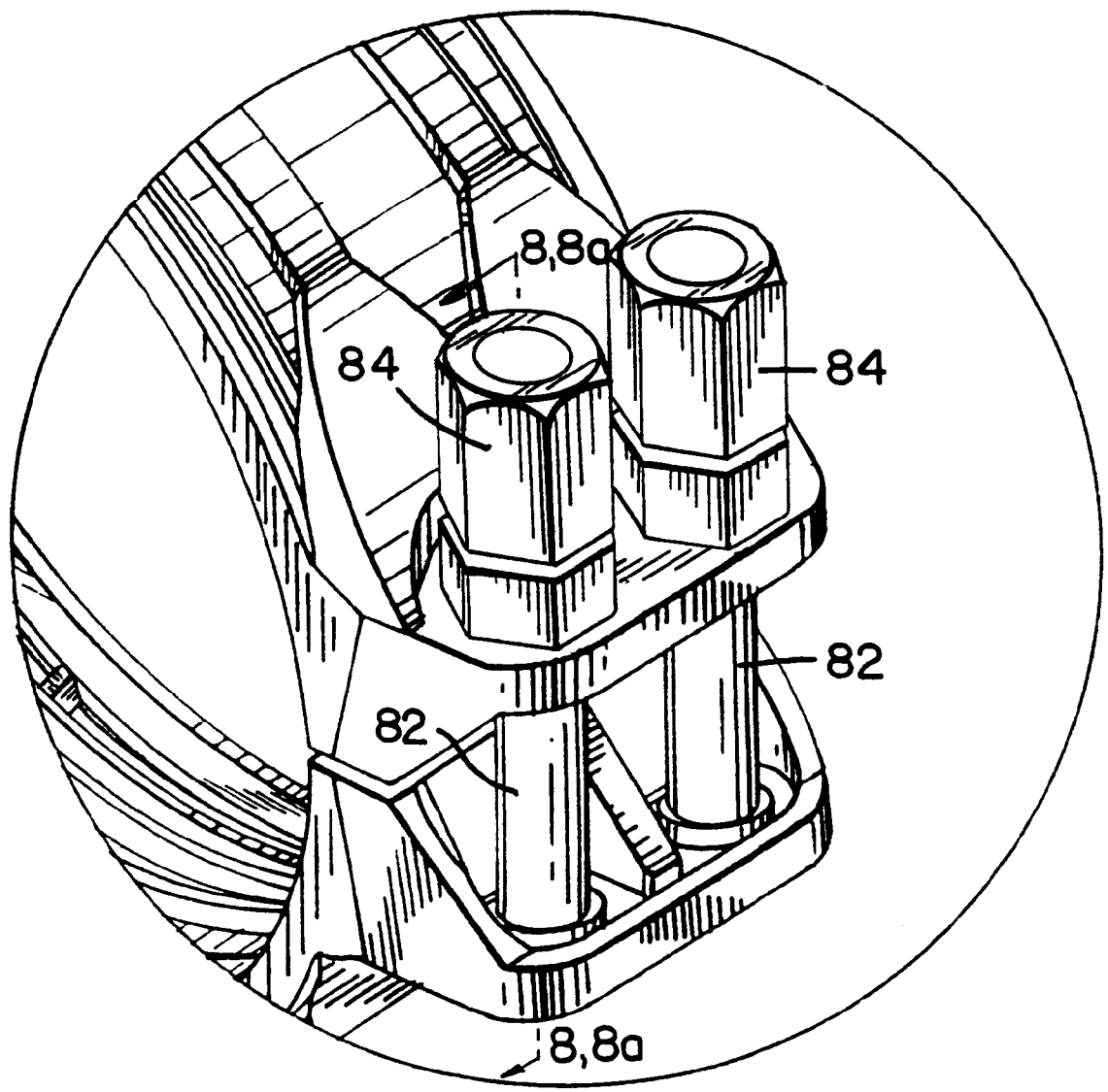
Figure 8A:
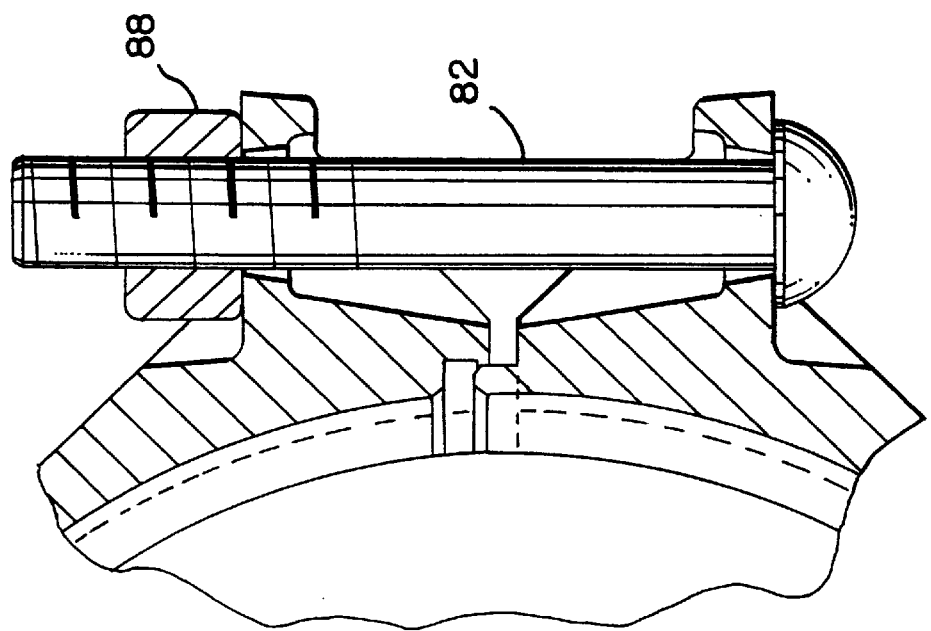
Figure 8:
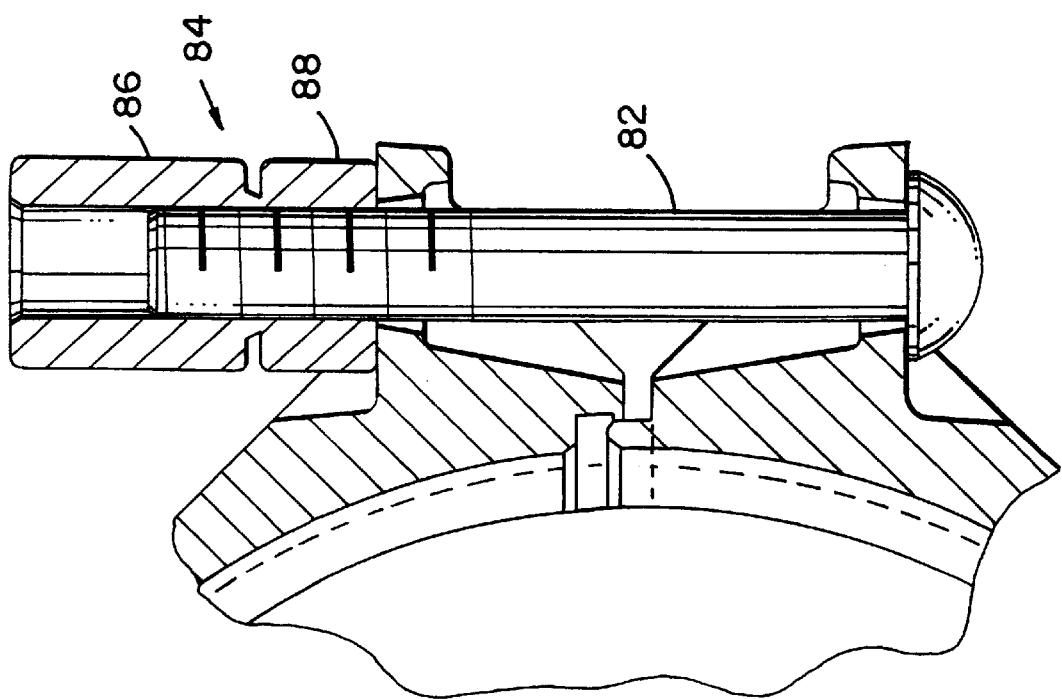
Figure 9:
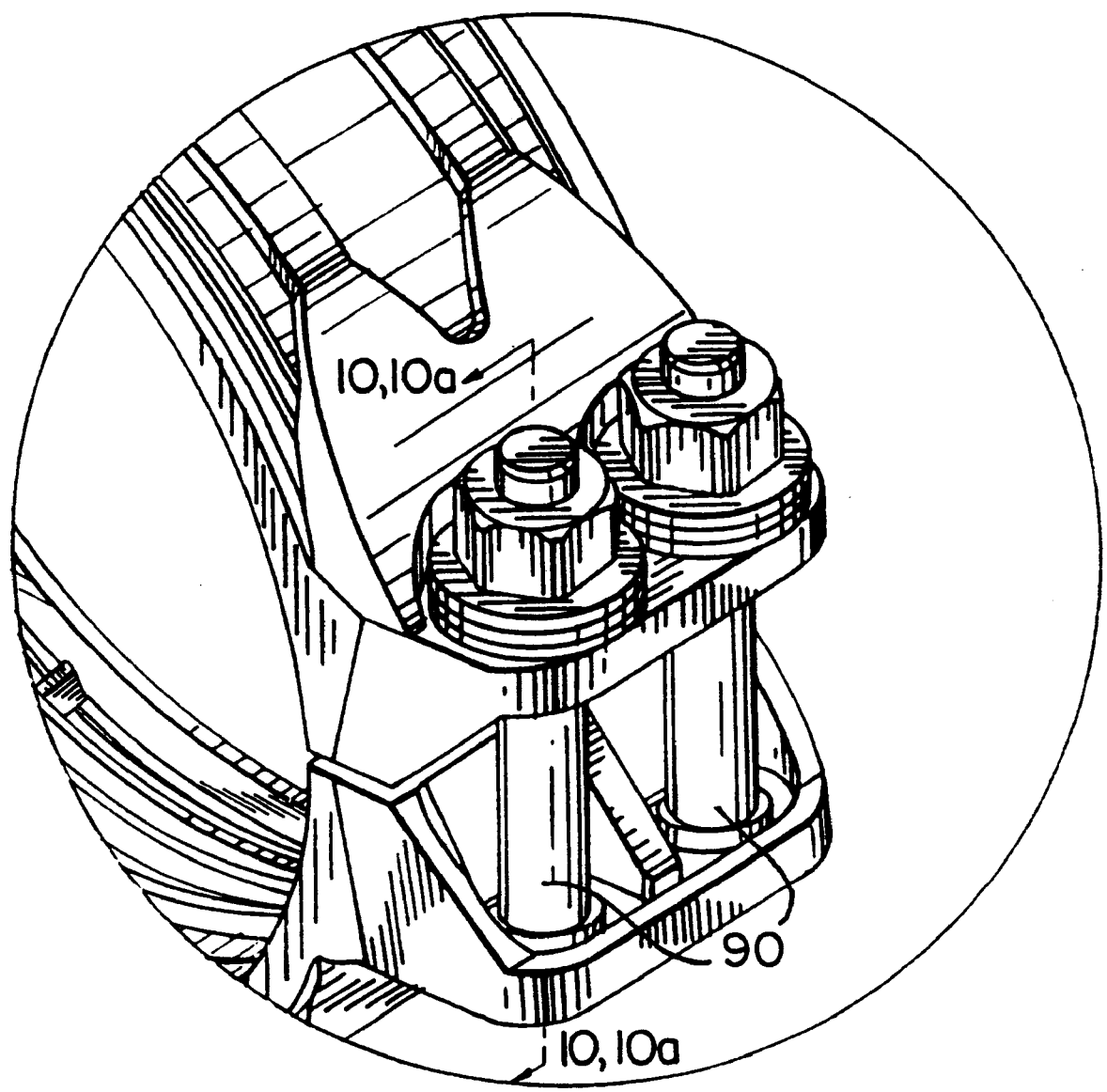

5 and shows the coupling segment in association with the juxtaposed end of a plain ended pipe and a grooved pipe;

FIG. 7 is a partial perspective view of a segmented pipe coupling according to the invention, wherein the bolts holding the coupling segments together have breakaway nuts to indicate when the bolts have been sufficiently torqued;

FIG. 8 is a cross-section taken along the section line 8—8 in FIG. 7 showing a bolt and breakaway nut before tightening;

FIG. 8a is a cross-section taken along the section line 8a—8a in FIG. 7 showing the bolt and breakaway nut after tightening;

FIG. 9 is a partial perspective view of a segmented pipe coupling according to the invention, wherein the bolts holding the coupling segments together have collapsible washers to indicate when the bolts have been sufficiently torqued;

FIG. 10 is a cross-section of FIG. 9 taken along section line 10—10 in FIG. 9 showing a bolt and collapsible washer before tightening; and FIG. 10a is a cross-section of FIG. 9 taken along section line 10a—10a in FIG. 9 showing the bolt and collapsible washer after tightening.

DESCRIPTION OF THE PREFERRED EMBODIMENTS

Figure 1:
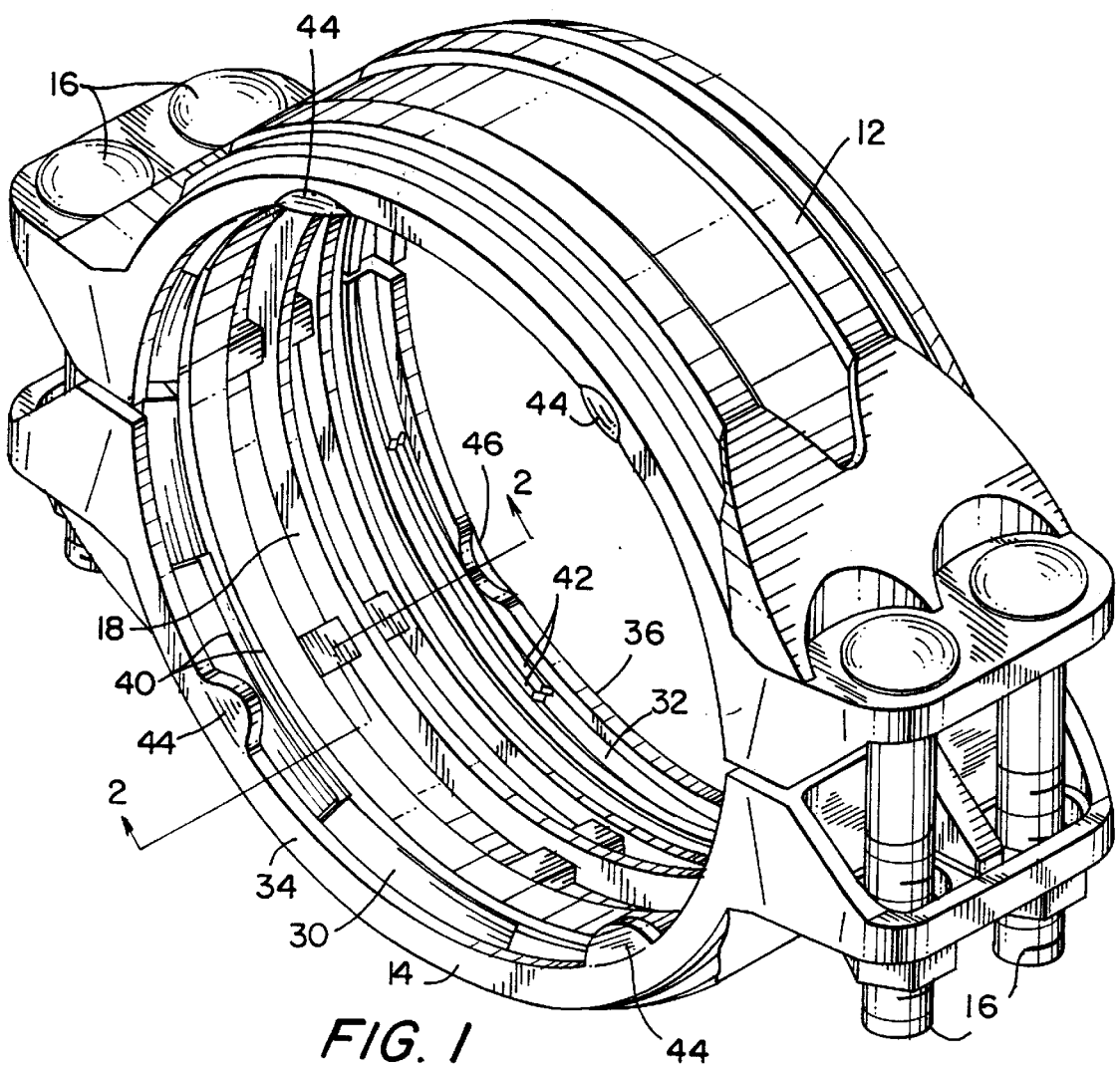
FIG. 1 is a perspective view of a segmented pipe coupling assembled from coupling segments of a first embodiment of the present invention, the coupling segments having crimped walls to secure cutter members.

Referring first to FIG. 1, a segmented pipe coupling is shown which is comprised of coupling segments 12 and 14, which are secured to each other at their opposite ends by traction bolts 16 in a manner well-known in the art.

Figure 2:
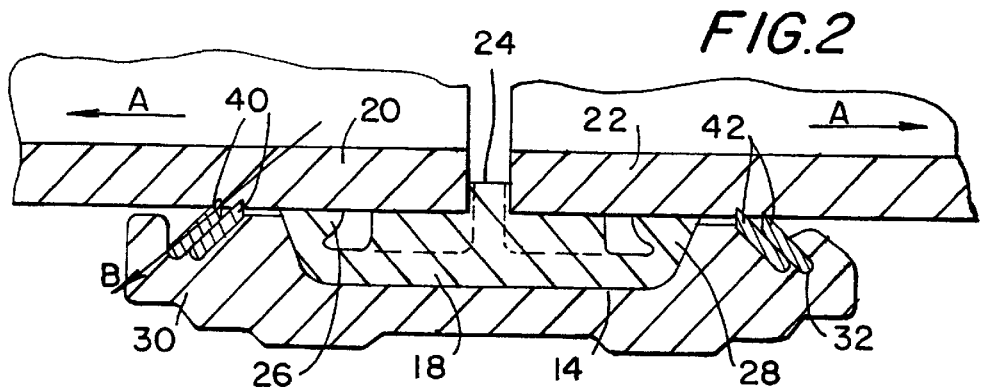
FIG. 2 is a transverse cross-section through one the coupling segments taken on the line 2—2 in FIG. 1, and showing the coupling segment in association with the juxtaposed ends of a pair of plain ended pipes.
Figure 3:
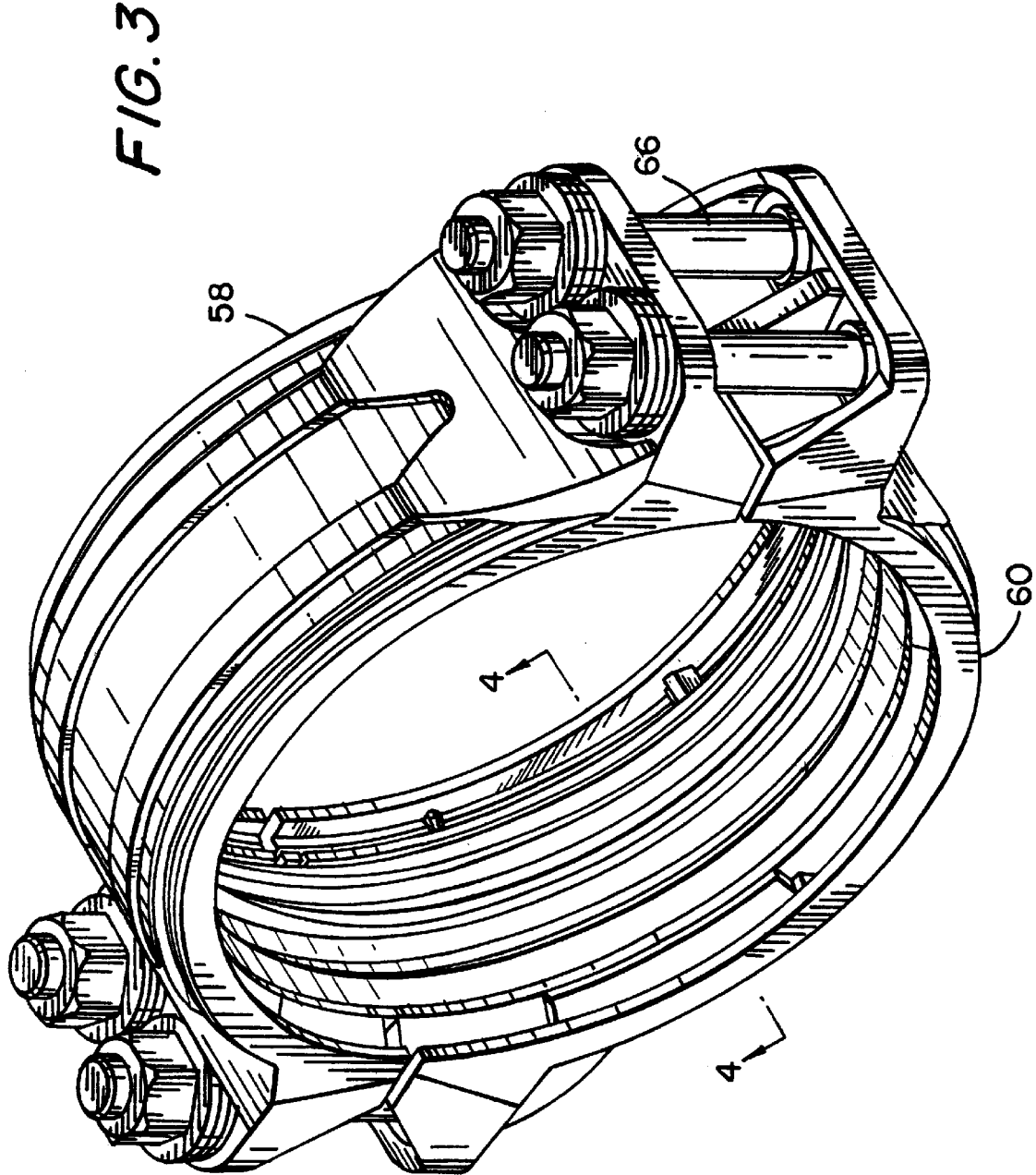
FIG. 3 is a perspective view of a segmented pipe coupling assembled from coupling segments of a second embodiment of the present invention, the cutter members of which are secured within the coupling segment by acrylic adhesive.
Figure 4:
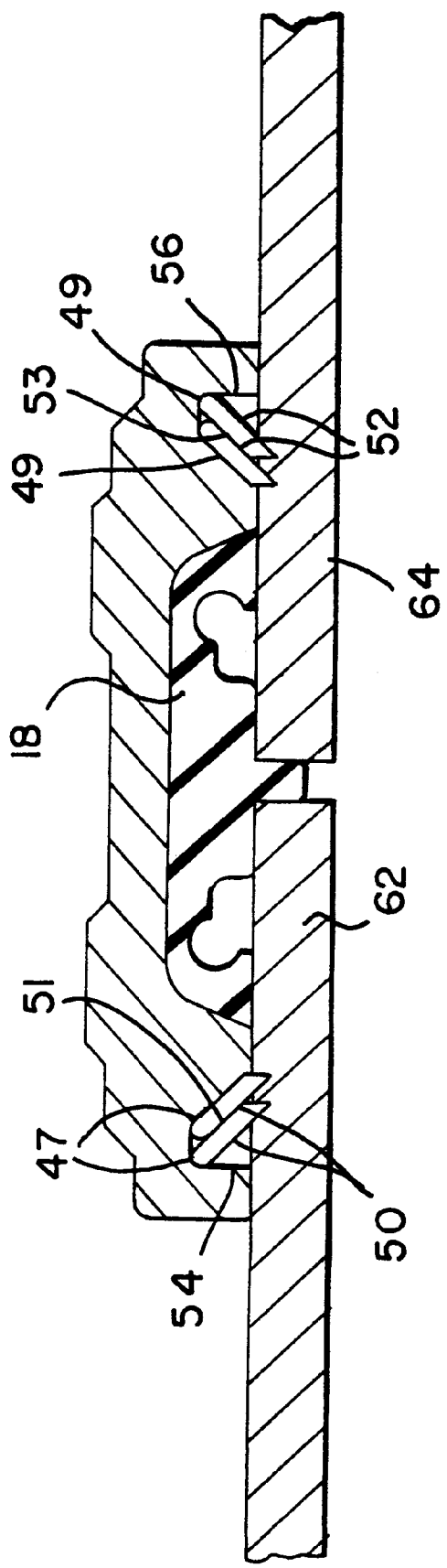
FIG. 4 is a transverse cross-section through one of the coupling segments taken along the section line 4–4 in FIG. 3 and shows the coupling segment in association with ends of a pair of plain ended pipes.

As is more clearly shown in FIG. 2, the coupling segments 12 and 14 surround and embrace a sealing gasket 18, which, in the assembled condition of the coupling is held under compression against the exterior pipes 20 and 22, that are arranged with their ends in closely adjacent relationship.

Optionally, the sealing gasket 18 includes a stem 24 extending radially inward of the coupling, and which provides a seal between the juxtaposed end faces of the pipes 20 and 22. The sealing gasket 18 includes sealing lips 26 and 28 that are engaged with the outer circumference of the respective pipes, the respective pipes 20 and 22 being devoid of the usual grooves adjacent the end of the pipes, and which usually are provided for the reception of keys on the segmented pipe coupling.

The coupling segments 12 and 14, unlike prior art constructions, do not include locating keys casted integrally with the coupling segment. Instead, channels 30 and 32 are provided adjacent opposite sides of the coupling segments, which are flanked by radially inwardly extending flanges 34 and 36.

Positioned within the respective channels 30 and 32 are arcuately shaped cutter members 40 and 42, the respective cutter members being secured within the channels 30 and 32 by crimps 44 and 46 in the respective radial flanges 34 and 36, thus to hold the cutter members immovable relative to the associated coupling segment 12 or 14.

At the time the segmented coupling is assembled onto the ends of the pipes 20 and 22, upon torquing down of the bolts 16, the cutter members 40 and 42 each bite into the exterior periphery of the associated pipe 20 or 22, thus to hold the respective pipes 20 and 22 against axial movement, as indicated by the arrows A.

The respective cutter members 40 and 42 are each inclined relative to the radial plain, the respective cutter members being inclined towards each other, thus to produce a resultant force in the direction of the arrow B in the respective cutter members 40 and 42, which themselves are bottomed down in the channels 30 and 32, and which thus produce a tensile force in the body of a coupling segment 14.

Formation of the crimps 44 and 46 easily can be accomplished by a staking operation, the material from which the respective segments are formed, i.e., ductile iron, being conducive to such a staking operation. That staking operation cannot be carried out on cast iron, due to the crystaline structure of cast iron, thus mandating the casting of the respective coupling segments from a ductile iron capable of deformation by cold-working of the metal.

The cutter members 40 and 42 are fabricated from an entirely different metal, the metal of choice being high strength steel. The respective cutter members themselves are formed as edge wound dished rings of pre-hardened spring tempered flat wire, which are then flat ground to produce a sharp cutting edge for biting engagement with the exterior surfaces of the pipes 20 and 22. The sharpened edge wound dished rings are cut to the required length to provide the cutting members 40 and 42. The process of forming the respective cutter members as edge wound dished rings from pre-hardened spring tempered flat wire readily permits the formation of the respective cutter members for them to be arcuate on a radius, which, when the cutter member are installed in the respective coupling segments, will result in the cutting edges of the cutter members being arranged in concentric relation with the associated coupling segment.

In a second embodiment of the invention, arcuately shaped cutter members 50 and 52 are secured within the channels 54 and 56, formed with the coupling segments 58, 60 by acrylic adhesive or other affixation means interposed between the cutter members 50 and 52 and the inner surfaces 47, 49 of the walls of the channels 54 and 56 and applied on the contacting surfaces 51, 53 of a pair of the cutter members 50, 52. The cutter members, 50 and 52, each bite into the exterior periphery of the pipe on which each is located, 62 or 64, when the segment coupling is assembled onto the ends of the pipes, 62 and 64, and the bolts 66 are torqued down. The use of acrylic adhesive or other affixation means is used instead of the crimps in the respective radial flanges present in the first embodiment.

Figure 5:
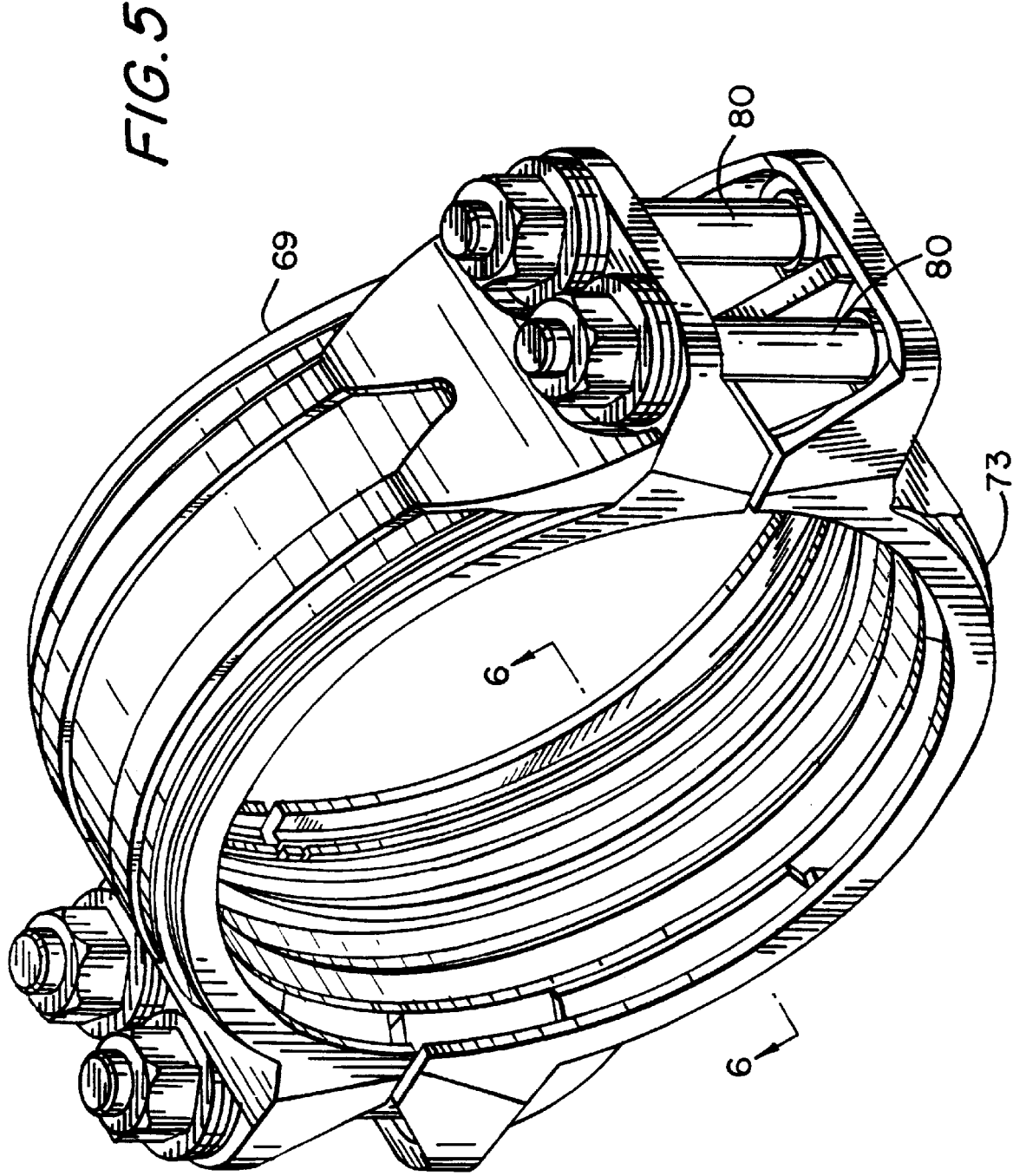
FIG. 5 is a perspective view of a segmented pipe coupling assembled from coupling segments of a third embodiment of the present invention connecting a plain ended pipe to a grooved pipe.
Figure 6:
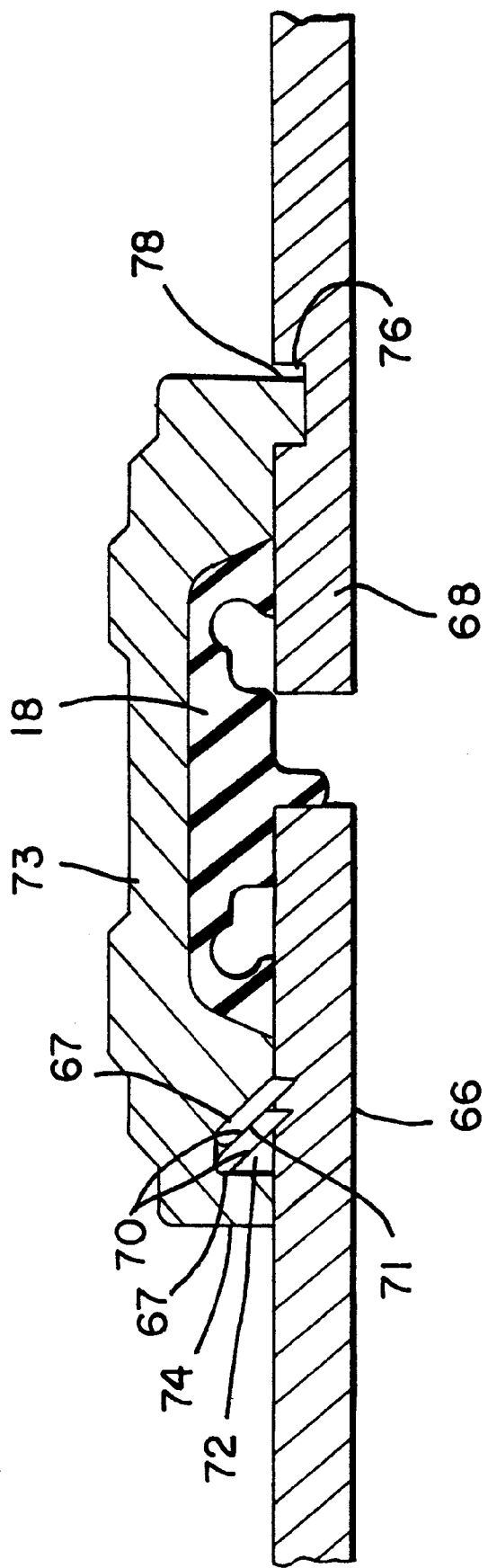
FIG. 6 is a transverse cross-section through one of the coupling segments taken along the section line 6—6 in FIG.

A third embodiment of the invention allows a plain ended pipe or fitting 66 to be secured to a grooved pipe or fitting 68, see FIGS. 5 and 6. As previously described, the cutter members 70 may be secured within the channel 72 formed within coupling segments 69, 73 by acrylic adhesive or other affixation means applied between the cutter members 70 and the inner surfaces 67 of the walls of the channel 72 and on the contacting surfaces 71 of the cutter members 70. Alternatively, and as also previously described, the cutter members 70 may be held by crimps (not shown) in the radial flange 74 of the channel 72. The portion of the coupling segment 69, 73 attached to the grooved pipe or fitting 68 fits into the groove 76 on that pipe by means of an integrally casted locating key or projection 78. Of course, a leaktight attachment between the pipes or fittings is achieved, as in the other embodiments of the invention, by torquing down of the bolts 80.

It is desirable to provide a design and method whereby the bolts holding the coupling segments of the segmented coupling together may be sufficiently torqued to achieve a connection which will prevent any material flowing through the connected pipes or fittings from leaking out of those pipes or fittings, yet prevent overtorque which would result in unnecessary and possibly damaging stress to the pipes or fittings, the coupling segments, and their associated bolting pads.

For example, as shown in FIGS. 7, 8, and 8a, the bolts 82 may be provided with breakaway nuts 84. Each breakaway nut 84 comprises an upper section 86 and a lower section 88 before the nut is tightened. When the nut 84 and therefore the bolt 82 reaches an acceptable torque as defined above, the upper section 86 of the nut 84 is designed to break off upon further attempted torquing, thus indicating to the individual assembling the coupling that a proper torque for that bolt 82 has been achieved.

An alternative design and method to prevent undertorquing or overtorquing of the bolts is shown in FIGS. 9, 10, and 10a. Bolts 90 may be provided with collapsible washers 92 between the nuts 94 to be torqued and the bolting pads 96. The collapsible washers 92 comprise two or more plates 98 vertically spaced apart from each other before tightening of the nuts 94, see FIG. 10. When the proper torque has been applied to the nut 94 and therefore to the bolt 90, the collapsible washer 92 will collapse, eliminating the space between the plates 98 existing before tightening, see FIG. 10a.

As will be readily apparent, while the segmented pipe coupling described above is intended for use with ductile iron pipe, and for carbon, steel, copper or other metal pipe equally well, the segmented pipe coupling could be employed for joining lengths of pipe of plastics material. Further, in the event that lengths of pipe of plastics material are to be coupled to each other, then, the body of the coupling segments 12 and 14, instead of being castings of a ductile iron could be moldings of a suitable plastics material that is capable either cold-working, or thermal-plastic deformation in order to secure the cutter members 40 and 42 within the coupling segment.

Other modifications will suggest themselves to persons skilled in the art. For example, instead of providing two sets of cutter members 40 and 42 of lesser arcuate extent than the arcuate extent of the coupling segment, the cutter members can be made of equal arcuate extent to the arcuate extent of the associated coupling segment.

What is claimed is:

1. A coupling system for a segmented pipe coupling for use with plain ended pipe, said coupling segment including:
   at least two channels, one of said at least two channels provided adjacent each opposite side edge of said coupling segment; and
   at least one cutter member of high strength steel secured within at least said one of said at least two channels by means for securing said at least one cutter member with at least said one of said at least two channels, said means for securing being applied to said at least one cutter member and to at least said one of said at least two channels;
   said at least one cutter member being arcuate about a radius and concentric with an inner radius of said coupling segment;
   said a least one cutter member having a radially innermost edge providing a cutting edge;
   at least one of said at least one cutter member being of a shape in radial cross-section having four sides, two of said four sides being longer than the remaining two sides, said two of said four sides being substantially parallel and linear.
   at least one of said at least two channels having a wall contacting a side of said two of said four sides along substantially an entire length of said side.

2. The coupling segment of claim 1, in which said at least one cutter member extends at an angle to a longitudinal axis of said coupling segment, said at least one cutter member at a first of said opposite side edges of said coupling segment being arranged in converging relation with respect to said at least one cutter member at a second of said opposite side edges of said coupling segment.

3. The coupling segment of claim 1, wherein said means for securing comprises acrylic adhesive.

4. The coupling segment of claim 1, wherein said at least one cutter member comprises a plurality of cutter members at said each opposite side edge of said coupling segment.

5. The coupling segment of claim 1, wherein said at least one cutter member comprises a plurality of cutter members arranged in angularly spaced relation at said each opposite side edge of said coupling segment.

6. The coupling segment of claim 1, in which said at least one cutter member is comprised of a metal stamping, and in which said radially innermost cutting edge comprises a ground portion of said at least one cutter member.

7. A coupling segment for a segmented pipe coupling for use in securing the ends of a pipe together, said coupling segment including:
   at least two channels, one of said at least two channels provided adjacent each opposite side edge of said coupling segment;
   at least one cutter member secured within at least said one of said at least two channels by means for securing said at least one cutter member within at least said one of said at least two channels, said means for securing being applied to said at least one cutter member and to at least said one of said at least two channels;
   said coupling segment formed of a first material and said at least one cutter member formed of a second material;
   said at least one cutter member being arcuate about a radius and concentric with an inner radius of said coupling segment;
   said at least one cutter member having a radially innermost edge providing a cutting edge;
   at least one of said at least one cutter member being of a shape in radial cross-section having four sides, two of said four sides being longer than the remaining two sides, said two of said four sides being substantially parallel and linear;
   said second material being predeterminedly selected such that said cutting edge can bite into the material forming the pipe; and
   at least said one of said at least two channels having a wall contacting a side of said two of said four sides along substantially an entire length of said side.

8. The coupling segment of claim 7, in which said first material is a plastic material.

9. The coupling segment of claim 7, in which both said first material and the material of the pipe are plastic materials.

10. The coupling segment of claim 7, wherein said second material is harder than said first material.

11. The coupling segment of claim 7, wherein said at least one cutter member comprises at least one pair of cutter members, the individual cutter members of said at least one pair of cutter members being secured within each of said one of said at least two channels provided adjacent each opposite side edge of said coupling segment.

12. The coupling segment of claim 11, wherein the individual cutter members of said at least one pair of said cutter member are of substantially equal arcuate extent.

13. A plurality of coupling segments for a segmented pipe coupling for use with plain ended pipe, each coupling segment of said plurality of coupling segments including:

at least two channels;

at least one cutter member of high strength steel secured within each channel of said at least two channels, two of said at least two channels being adjacent respective opposite side edges of said coupling segment;

said at least one cutter member being arcuate about a radius and concentric with an inner radius of said coupling segment;

said at least one cutter member having a radially innermost edge providing a cutting edge;

said at least one cutter member being of a shape in radial cross-section having four sides, two of said four sides being longer than the remaining two sides, said two of said four sides being substantially parallel and linear;

adjacent coupling segments of said plurality of coupling segments having means for indicating when the strength of connection between said adjacent coupling segments is acceptable;

one of said at least one cutter member having a side of said two of said four sides contacting a wall of one of said at least two channels along substantially an entire length of said side.

14. A plurality of coupling segments as claimed in claim 13, wherein said means for indicating comprises at least one breakaway nut.

15. A method for tightening the adjacent coupling segments of the plurality of coupling segments of claim 14, said method comprising the steps of:

a. placing the breakaway nut on a bolt connecting the adjacent coupling segments, said breakaway nut contacting a bolting pad, said bolting pad being a part of one of the adjacent coupling segments; and b. tightening the breakaway nut against the bolting pad until an upper portion of the breakaway nut separates from the remainder of the breakaway nut.

16. A plurality of coupling segments as claimed in claim 13, wherein said means for indicating comprises at least one collapsible washer.

17. A method for tightening the adjacent coupling segments of the plurality of coupling segments of claim 16, said collapsible washer comprising a plurality of plates, adjacent plates being spaced apart from each other vertically, said method comprising the steps of:

a. placing said collapsible washer on a bolt connecting the adjacent coupling segments, said collapsible washer being placed between a nut and a bolting pad, said bolting pad being a part of one of the adjacent coupling segments; and b. tightening the nut, thereby compressing the collapsible washer, until each plate is in contact with at least one plate adjacent to each said plate.

18. A plurality of coupling segments for a segmented pipe coupling for use in securing the ends of a pipe together, each coupling segment of said plurality of coupling segments including:

at least two channels;

at least one cutter member secured within said coupling segment, at least one of said at least one cutter member being in each of said at least two channels;

said coupling segment formed of a first material and said at least one cutter member formed of a second material;

said at least one cutter member being arcuate about a radius and concentric with an inner radius of said coupling segment;

said at least one cutter member having a radially innermost edge providing a cutting edge;

said at least one cutter member being of a shape in radial cross-section having four sides, two of said four sides being longer than the remaining two sides, said two of said four sides being substantially parallel and linear;

said second material being predeterminedly selected such that said cutting edge can bite into the material forming the pipe;

adjacent coupling segments of said plurality of coupling segments having means for indicating when the strength of connection between said adjacent coupling segments is acceptable;

one of said at least one of said at least one cutter member having a side of said two of said four sides contacting a wall of one of said at least two channels along substantially an entire length of said side.

19. A plurality of coupling segments as claimed in claim 18, wherein said means for indicating comprises at least one breakaway nut.

20. A method for tightening the adjacent coupling segments of the plurality of coupling segments of claim 19, said method comprising the steps of:

a. placing the breakaway nut on a bolt connecting the adjacent coupling segments, said breakaway nut contacting a bolting pad, said bolting pad being a part of one of the adjacent coupling segments; and b. tightening the breakaway nut against the bolting pad until an upper portion of the breakaway nut separates from the remainder of the breakaway nut.

21. A plurality of coupling segments as claimed in claim 18, wherein said means for indicating comprises at least one collapsible washer.

22. A method for tightening the adjacent coupling segments of the plurality of coupling segments of claim 21, said collapsible washer comprising a plurality of plates, adjacent plates being spaced apart from each other vertically, said method comprising the steps of:

a. placing said collapsible washer on a bolt connecting the adjacent coupling segments, said collapsible washer being placed between a nut and a bolting pad, said bolting pad being a part of one of the adjacent coupling segments; and b. tightening the nut, thereby compressing the collapsible washer, until each plate is in contact with at least one plate adjacent to each said plate.

23. A coupling segment for a segmented pipe coupling for use with a plain ended pipe juxtaposed to a grooved ended pipe, said coupling segment including:

at least one channel, one of said at least one channel provided adjacent a first side edge of said coupling segment;

at least one cutter member of high strength steel secured within at least said one of said at least one channel; and a key provided adjacent a second side edge of said coupling segment;

said at least one cutter member being arcuate about a radius and concentric with an inner radius of said coupling segment;

said at least one cutter member having a radially innermost edge providing a cutting edge;

said at least one cutter member being of a shape in radial cross-section having four sides, two of four four sides being longer than the remaining two sides, said two of said four sides being substantially parallel and linear;

at least said one of said at least one channel having a wall contacting a side of said two of said four sides of one of said at least one cutter member along substantially an entire length of said side.

24. The coupling segment of claim 23, in which said at least one cutter member extends at an angle to a longitudinal axis of said coupling segment.

25. The coupling segment of claim 23, wherein said at least one cutter member is secured within said at least one channel by at least one crimp formed in said first side edge of said coupling segment.

26. The coupling segment of claim 23, wherein said at least one cutter member is secured within said at least one channel by acrylic adhesive.

27. The coupling segment of claim 23, wherein said at least one cutter member comprises a plurality of cutter members at said first side edge of said coupling segment.

28. The coupling segment of claim 23, wherein said at least one cutter member comprises a plurality of cutter members arranged in angularly spaced relation at said first side edge of said coupling segment.

29. The coupling segment of claim 23, in which said at least one cutter member is comprised of a metal stamping, and in which said radially innermost cutting edge comprises a ground portion of said at least one cutter member.

30. A coupling segment for a segmented pipe coupling for use in securing the ends of a pipe together, said coupling segment including:
   at least one channel, one of said at least one channel provided adjacent a first side edge of said coupling segment;
   at least one cutter member secured within at least said one of said at least one channel;
   a key provided adjacent a second side edge of said coupling segment;
   said coupling segment formed of a first material and said at least one cutter member formed of a second material;
   said at least one cutter member being arcuate about a radius and concentric with an inner radius of said coupling segment;
   said at least one cutter member having a radially innermost edge providing a cutting edge;
   said at least one cutter member being of a shape in radial cross-section having four sides, two of said four sides being longer than the remaining two sides, said two of said four sides being substantially parallel and linear;
   said second material being predeterminedly selected such that said cutting edge can bite into the material forming the pipe; and
   at least said one of said at least one channel having a wall contacting a side of said two of said four sides of one of said at least one cutter member along substantially an entire length of said side.

31. The coupling segment of claim 30, in which said first material is a plastic material.

32. The coupling segment of claim 30, in which both said first material and the material of the pipe are plastic materials.

33. The coupling segment of claim 30, wherein said second material is harder than said first material.

34. The coupling segment of claim 30, including at least one pair of said cutter member, the individual cutter members of said at least one pair of said cutter member being secured within said one of said at least one channel provided adjacent said first side edge of said coupling segment.

35. The coupling segment of claim 34, wherein the individual cutter members of said at least one pair of said cutter member are of substantially equal arcuate extent.

36. A plurality of coupling segments for a segmented pipe coupling for use with a plain ended pipe juxtaposed to a grooved ended pipe, each coupling segment of said plurality of coupling segments including:
   at least one cutter member of high strength steel secured within said coupling segment adjacent a first side edge of said coupling segment;
   at least one channel, one of said at least one channel being provided adjacent said first side edge of said coupling segment;
   a key provided adjacent a second side edge of said coupling segment;
   said at least one cutter member being arcuate about a radius and concentric with an inner radius of said coupling segment;
   said at least one cutter member having a radially innermost edge providing a cutting edge;
   said at least one cutter member being of a shape in radial cross-section having four sides, two of said four sides being longer than the remaining two sides, said two of said four sides being substantially parallel and linear;
   adjacent coupling segments of said plurality of coupling segments having means for indicating when the strength of connection between said adjacent coupling segments is acceptable;
   at least said one of said at least one channel having a wall contacting a side of said two of said four sides of one of said at least one cutter member along substantially an entire length of said side.

37. A plurality of coupling segments as claimed in claim 36, wherein said means for indicating comprises at least one breakaway nut.

38. A method for tightening the adjacent coupling segments of the plurality of coupling segments of claim 37, said method comprising the steps of:
   a. placing the breakaway nut on a bolt connecting the adjacent coupling segments, said breakaway nut contacting a bolting pad, said bolting pad being a part of one of the adjacent coupling segments; and
   b. tightening the breakaway nut against the bolting pad until an upper portion of the breakaway nut separates from the remainder of the breakaway nut.

39. A plurality of coupling segments as claimed in claim 36, wherein said means for indicating comprises at least one collapsible washer.

40. A method for tightening the adjacent coupling segments of the plurality of coupling segments of claim 39, said collapsible washer comprising a plurality of plates, adjacent plates being spaced apart from each other vertically, said method comprising the steps of:
   a. placing said collapsible washer on a bolt connecting the adjacent coupling segments, said collapsible washer being placed between a nut and a bolting pad, said bolting pad being a part of one of the adjacent coupling segments; and
   b. tightening the nut, thereby compressing the collapsible washer, until each plate is in contact with at least one plate adjacent to each said plate.

41. A plurality of coupling segments for a segmented pipe coupling for use in securing the end of a plain ended pipe and the end of a grooved ended pipe together, each coupling segment of said plurality of coupling segments including:
   at least one channel;
   at least one cutter member secured within said coupling segment in said at least one channel;

a key provided within said coupling segment;

said coupling segment formed of a first material and said at least one cutter member formed of a second material;

said at least one cutter member being arcuate about a radius and concentric with an inner radius of said coupling segment;

said at least one cutter member having a radially innermost edge providing a cutting edge;

said at least one cutter member being of a shape in radial cross-section having four sides, two of four four sides being longer than the remaining two sides, said two of said four sides being substantially parallel and linear;

said second material being predeterminedly selected such that said cutting edge can bite into the material forming the pipe;

adjacent coupling segments of said plurality of coupling segments having means for indicating when the strength of connection between said adjacent coupling segments is acceptable;

at least one of said at least one channel having a wall contacting a side of said two of said four sides of one of said at least one cutter member along substantially an entire length of said side.

42. A plurality of coupling segments as claimed in claim 41, wherein said means for indicating comprises at least one breakaway nut.

43. A method for tightening the adjacent coupling segments of the plurality of coupling segments of claim 42, said method comprising the steps of:
   a. placing the breakaway nut on a bolt connecting the adjacent coupling segments, said breakaway nut contacting a bolting pad, said bolting pad being a part of one of the adjacent coupling segments; and
   b. tightening the breakaway nut against the bolting pad until an upper portion of the breakaway nut separates from the remainder of the breakaway nut.

44. A plurality of coupling segments as claimed in claim 41, wherein said means for indicating comprises at least one collapsible washer.

45. A method for tightening the adjacent coupling segments of the plurality of coupling segments of claim 44, said collapsible washer comprising a plurality of plates, adjacent plates being spaced apart from each other vertically, said method comprising the steps of:
   a. placing said collapsible washer on a bolt connecting the adjacent coupling segments, said collapsible washer being placed between a nut and a bolting pad, said bolting pad being a part of one of the adjacent coupling segments; and
   b. tightening the nut, thereby compressing the collapsible washer, until each plate is in contact with at least one plate adjacent to each said plate.

* * * * *